W. W. BURKE.
BRAKE FOR ROTARY SHAFTS.
APPLICATION FILED JAN. 15, 1914.

1,141,230. Patented June 1, 1915.

Witnesses:
Leonard A. Powell.
Ambrose E. Sullivan

Inventor:
William W. Burke
by his attorney
Charles S. Gooding.

UNITED STATES PATENT OFFICE.

WILLIAM W. BURKE, OF BENNINGTON, VERMONT, ASSIGNOR OF ONE-FOURTH TO JAMES E. BURKE AND ONE-FOURTH TO ALEXANDER J. COOPER, BOTH OF BENNINGTON, VERMONT.

BRAKE FOR ROTARY SHAFTS.

1,141,230.   Specification of Letters Patent.   Patented June 1, 1915.

Application filed January 15, 1914. Serial No. 812,321.

*To all whom it may concern:*

Be it known that I, WILLIAM W. BURKE, a citizen of the United States, residing at Bennington, in the county of Bennington and State of Vermont, have invented new and useful Improvements in Brakes for Rotary Shafts, of which the following is a specification.

This invention relates to a brake for rotary shafts, the object being to provide a brake for the driving shaft of a machine which can be quickly operated to stop the rotation of said driving shaft without jarring the machine and which is capable of long use without excessive wear.

The invention consists in the combination and arrangement of parts set forth in the following specification and particularly pointed out in the claims thereof.

Figure 1:
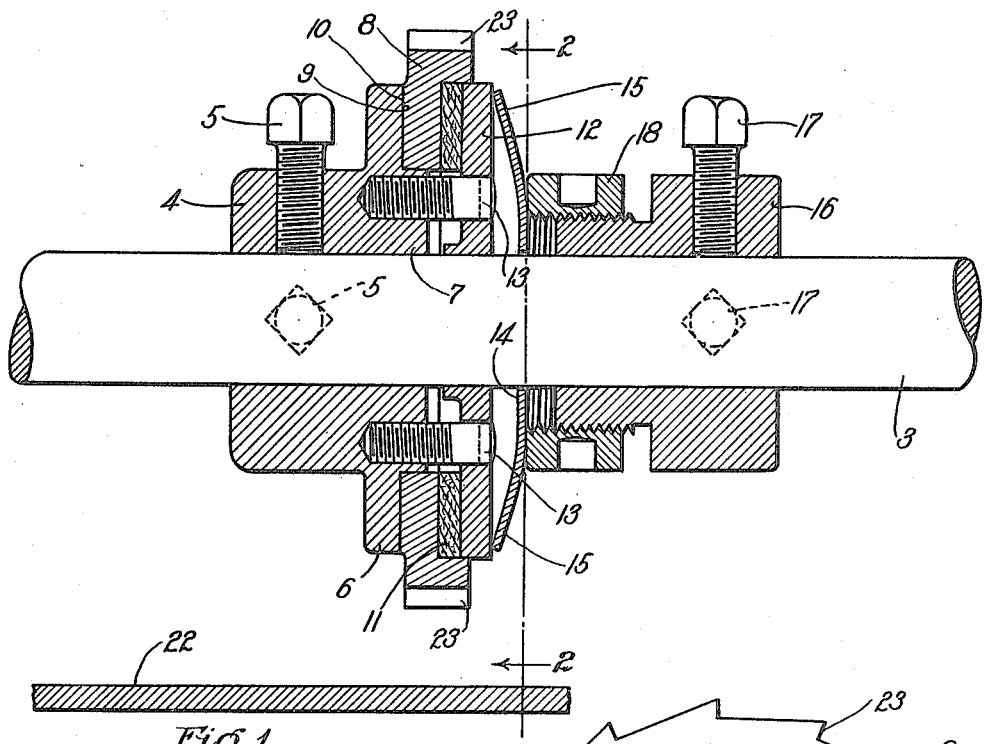
Figure 2:
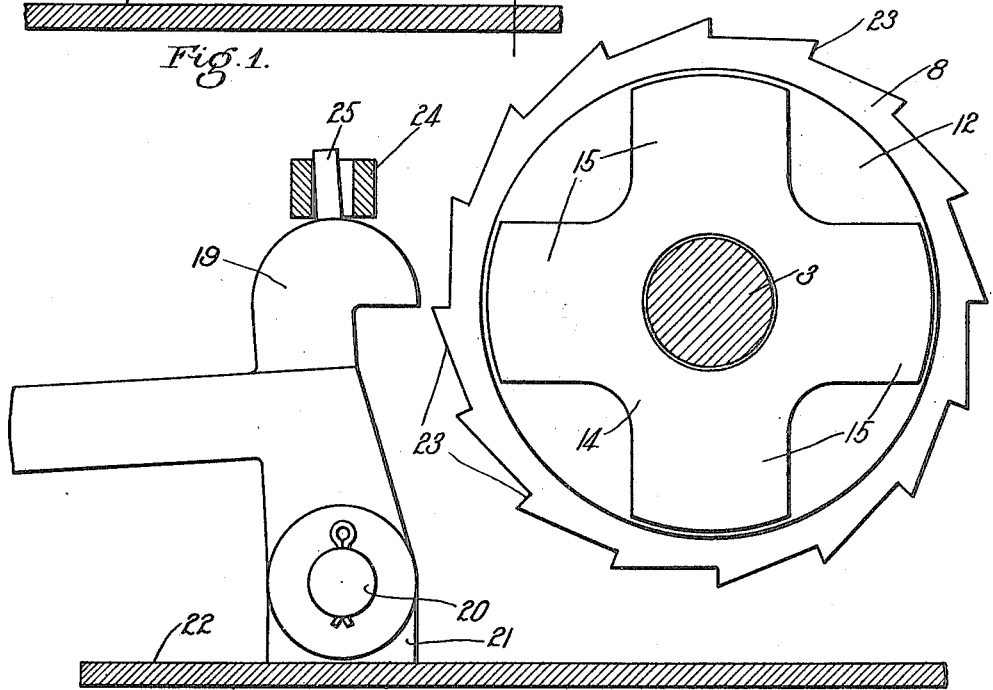

Referring to the drawings: Figure 1 is a sectional elevation of my improved brake. Fig. 2 is a sectional elevation taken on line 2—2 of Fig. 1.

Like numerals refer to like parts throughout the several views of the drawings.

In the drawings, 3 is a rotary shaft, 4 is a collar fastened to said shaft by a set-screw 5 and 6 is an annular flange and 7 a hub on said collar.

8 is an annular ratchet mounted to rotate on the hub 7 of the collar 4 and having one face 9 thereof bearing against a face 10 on the flange 6. Within the ratchet 8 is a ring 11 formed of a suitable frictional material to resist wear.

A disk 12 is mounted to slide longitudinally on the shaft 3 and is prevented from rotating relatively thereto by a plurality of guide pins 13 which have screw-threaded engagement with the collar 4 and project therefrom longitudinally of the shaft 3 into sliding engagement with the disk 12. A flat spring 14 is loosely mounted on the shaft 3 and is provided with a plurality of arms 15 which bear against one face of the disk 12. A second collar 16 is fastened to the shaft 3 by a set-screw 17 and a sleeve 18 has screw-threaded engagement with said collar 16, the spring 14 being interposed between one end of the sleeve 18 and the disk 12, whereby said disk may be forced against said friction ring 11 with a yielding pressure.

A pawl 19 is pivoted at 20 to an ear 21 upon a stationary frame 22 and said pawl is adapted to be moved into and out of engagement with the teeth 23 of the ratchet 8 by a suitable lever 24 which engages a pin 25 on the upper end of the pawl 19.

The general operation of the device hereinbefore specifically described is as follows: Assuming the shaft 3 to be rotating and that it is desired to stop the rotation of the same, the lever 24 is operated, preferably automatically, by a suitable mechanism to move the pawl 19 into engagement with the teeth 23 of the ratchet 8. This locks the ratchet against rotation and by the frictional engagement of the ring 11 with the disk 12, which disk is non-rotatable relatively to the shaft 3, the rotation of said shaft is brought to a gradual stop without jarring the machine.

Having thus described my invention, what I claim and desire by Letters Patent to secure is;

1. A brake having, in combination, a shaft, a collar fast thereto, an annular flange on said collar, a disk slidable on said shaft toward and away from said collar, a plurality of guide pins fast to said collar and extending therefrom longitudinally of said shaft into sliding engagement with said disk, whereby said disk is prevented from rotating on said shaft, a ratchet rotatably mounted on said collar with one face thereof bearing against said flange, a friction ring encircling said shaft within said ratchet and contacting with the opposite face of said ratchet, a flat spring mounted on said shaft adjacent to said disk, said spring having a plurality of arms adapted to engage said disk and force the same against said friction ring with a yielding pressure, an adjustable nut encircling said shaft in contact with said spring and adapted to vary the pressure of said arms against said disk and a pawl mounted on a stationary support and adapted to be moved into and out of engagement with said ratchet.

2. A brake having, in combination, a shaft, a collar fast thereto, an annular flange on said collar, a disk slidable on said shaft toward and away from said collar, means for preventing the rotation of said disk relatively to said shaft, a ratchet rotatably mounted on said collar with one face thereof bearing against said flange, a friction ring encircling said shaft between said ratchet and said disk, a flat spring mounted upon said shaft adjacent to said disk, said spring having a plurality of arms adapted to engage said disk and force the same against said friction ring with a yielding pressure, a stationary collar fast to said shaft at a distance from said disk, an adjustable nut having screw-threaded engagement with said stationary collar and adapted to engage said spring and to be adjusted on said stationary collar to vary the pressure of said arms against said disk, and a pawl adapted to be moved into and out of engagement with said ratchet.

In testimony whereof I have hereunto set my hand in presence of two subscribing witnesses.

WILLIAM W. BURKE.

Witnesses:
ROBT. E. HEALY,
F. B. PACKARD.

Copies of this patent may be obtained for five cents each, by addressing the "Commissioner of Patents, Washington, D. C."